United States Patent [19]

Heinrich et al.

[11] 4,229,303
[45] Oct. 21, 1980

[54] FILTER PRESS WITH CLEANSING SPRAY DEVICE

[76] Inventors: Hans J. Heinrich, Wilhelmshoeher Str. 129, Ennepetal; Max Oelbermann, Max-von-Laue-Str. 3, Remscheid; Karl A. Rademacher, Hatzfelder Str. 33, Wuppertal, all of Fed. Rep. of Germany

[21] Appl. No.: 23,383

[22] Filed: Mar. 23, 1979

[30] Foreign Application Priority Data

Mar. 28, 1978 [DE] Fed. Rep. of Germany ....... 2813236

[51] Int. Cl.³ .................... B01D 25/12; B08B 3/02
[52] U.S. Cl. .................... 210/225; 210/230; 210/409; 210/413; 100/112; 100/198; 134/104; 134/183; 134/199
[58] Field of Search ............... 210/225, 230, 224, 226, 210/227, 228, 229, 204, 247, 409, 410, 411, 412, 413, 414, 415, 231; 100/112, 196, 197, 198; 134/104, 109, 110, 154, 182, 183, 199

[56] References Cited

U.S. PATENT DOCUMENTS

| 2,783,892 | 3/1957 | Faler | 134/109 |
| 3,295,437 | 1/1967 | Fowler | 210/230 |
| 4,082,663 | 4/1978 | Sato | 210/79 |
| 4,107,042 | 8/1978 | Heinrich et al. | 210/225 |

FOREIGN PATENT DOCUMENTS 404436 5/1966 Australia .................... 210/225

*Primary Examiner*—Robert H. Spitzer
*Assistant Examiner*—David R. Sadowski
*Attorney, Agent, or Firm*—Abraham A. Saffitz

[57] ABSTRACT

A filter press provided with a spray cleansing device of the kind described in U.S. Pat. No. 4,107,042 granted Aug. 15, 1978 to wash filter plates of the press disposed in a stack on horizontal guides in which the spray device comprises a support frame which moves along the stack of plates on the horizontal guides. Two branch conduits of the device are fitted with nozzles and surround a plate being washed to spray wash the plate simultaneously from both sides. The specific improvement in the present invention comprises a novel spray water catch basin which has a width more than twice the spacing between the branch conduits. Movable segments on both sides of the catch basin are provided which may be pivoted about a perpendicular axis to adapt the catch basin to many locations along the filter press. The important difference is the fact that at least the edge portions of the catch basin are movable in a horizontal direction relative to the vertical area of the frame of the washing device to provide a beneficial advantage over our prior patent. A new suspension is also provided for the catch basin which is adapted to the movement of the segments.

9 Claims, 6 Drawing Figures

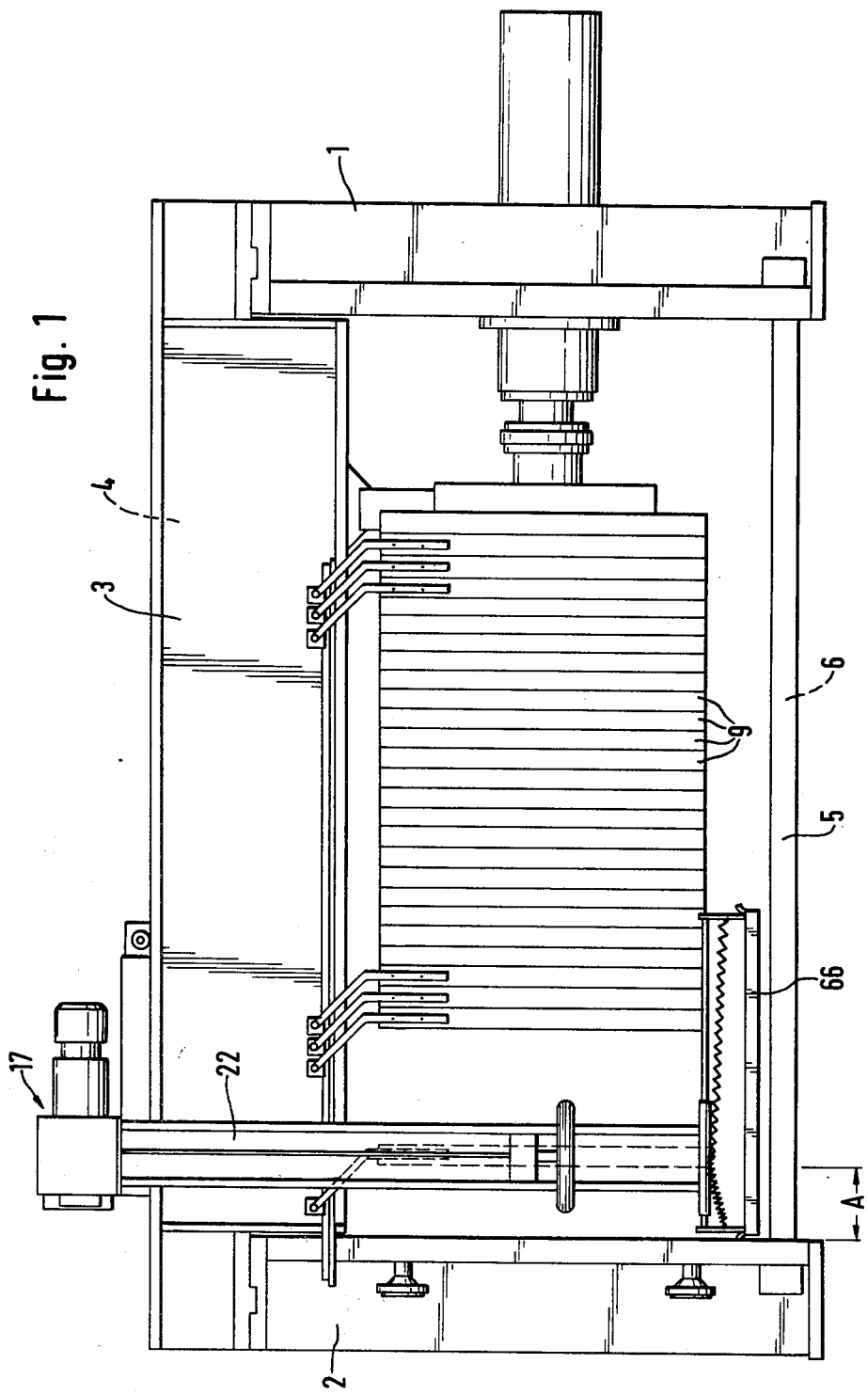

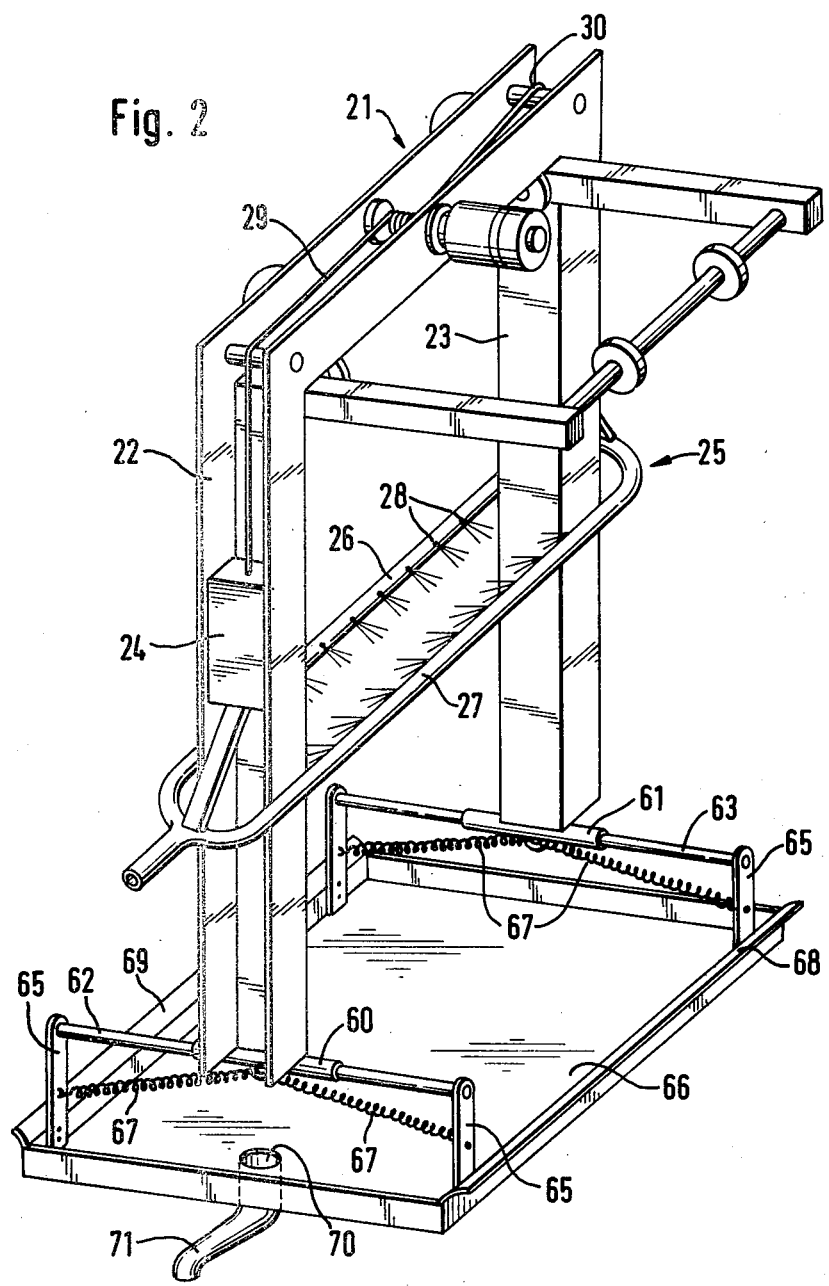

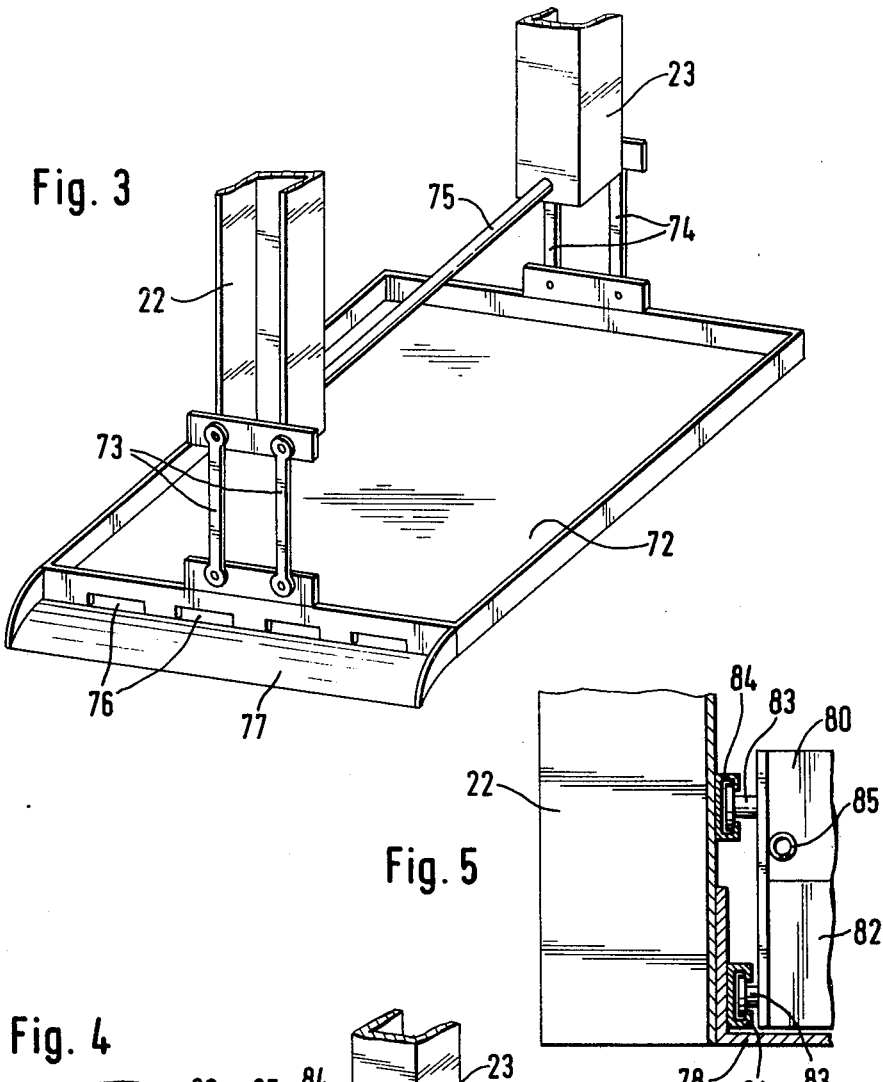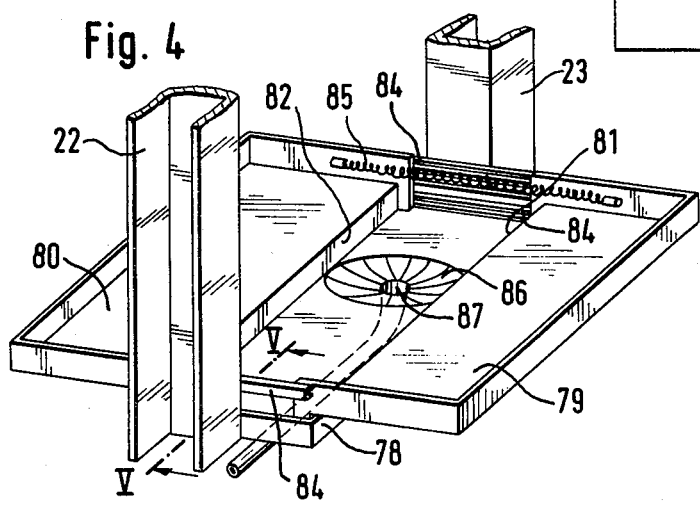

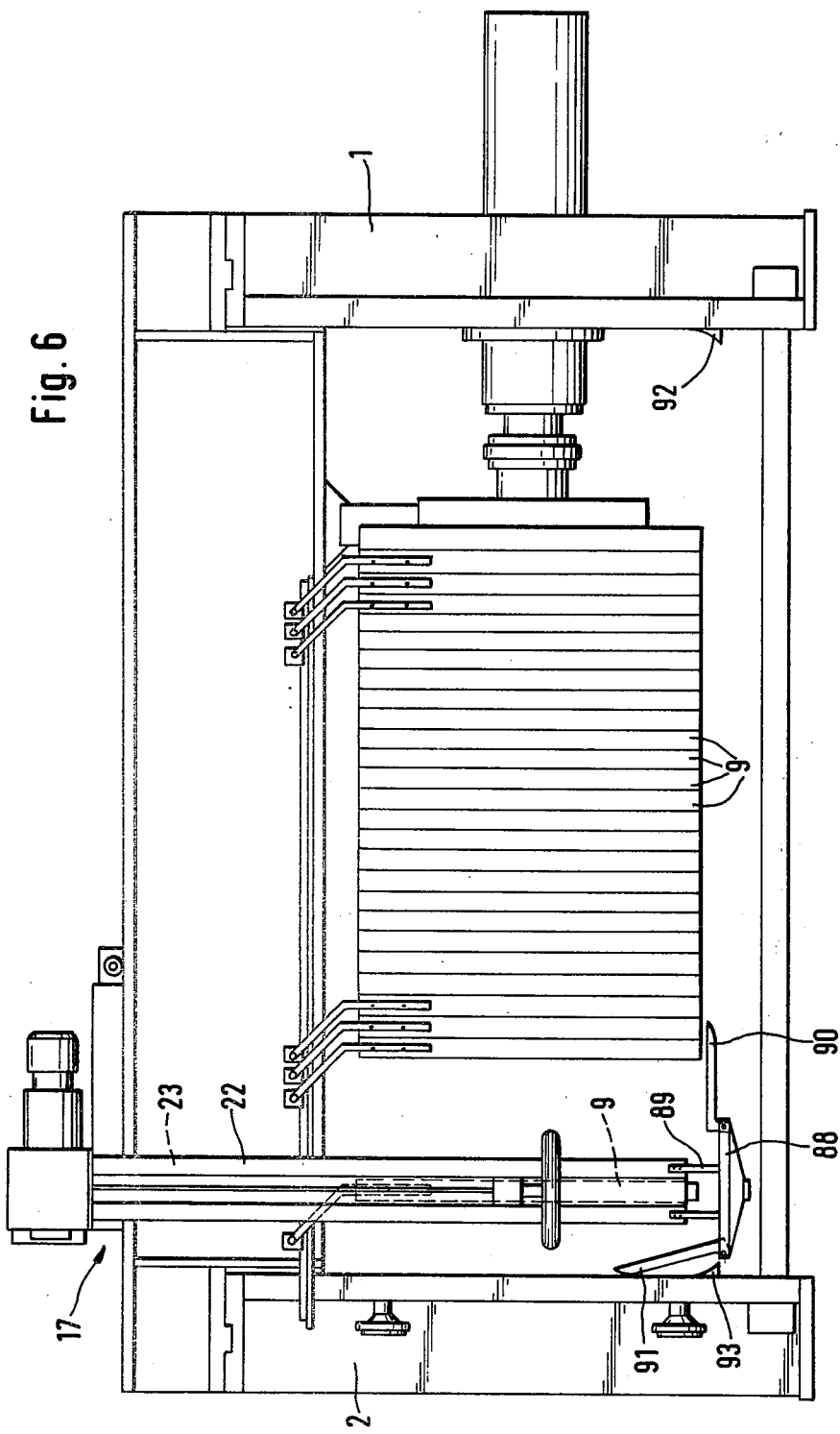

FILTER PRESS WITH CLEANSING SPRAY DEVICE

CROSS REFERENCE TO RELATED APPLICATION

Applicants make reference to West Germany Patent Application, Ser. No. P 28 13 236.7 filed in Germany Mar. 28, 1978 and claim priority thereto under 35 U. S. C. 119.

BACKGROUND OF THE INVENTION

1. Field of the Invention

The invention relates to a filter press with a cleansing spray device for the filter plates which are displaceable on horizontal guides which is of the type described in U.S. Pat. No. 4,107,042 granted Aug. 15, 1978.

2. Description of the Prior Art

In U.S. Pat. No. 4,107,042, the cleansing spray device comprises a support frame movable on horizontal guides along the stack of filter plates which it surrounds, a spray pipe with spray nozzles being vertically guided along vertical side posts of said support frame, the spray pipe comprising two branch lines enclosing between them a filter plate to be cleaned by spraying. A spray water catch basin is mounted to the underside of the support frame.

In this spray cleansing device the width of the spray water catch basin is specifically adapted to the longitudinal movement of the filter plates for the purpose of ejecting the filter cakes and the width of the catch basin is therefore relatively small. This limited width was found in practice to be a disadvantage when spraying the filter plates because appreciable amounts of water may by-pass the basin and reach the filter cake storage reservoir which lies below the filter press due to the fact that the spray water can not be easily guided, in its entirety, into the catch basin when using the simple guide and baffle walls described in U.S. Pat. No. 4,107,042.

OBJECTS OF THE INVENTION

It is an object of the invention to provide the spray cleansing device of the filter press of the above mentioned U.S. Pat. No. 4,107,042 with a novel and highly effective spray water catch basin which is capable of efficiently collecting the spray water dripping from the sprayed filter plates as well as the spray water bouncing from the sprayed filter plates onto adjacent filter plates without changing the basic design of the filter press or the path of the filter plates when opening the filter press.

To solve this problem, the invention provides a novel spray water catch basin structure which is wider than twice the spacing between two branch conduits and to further provide segmented portions of the basin, which portions are displaceable or pivoted on both sides along an axis which is perpendicular to the center plane of the support frame.

A further object of the invention is to provide a novel support frame for the catch basin so that said catch basin can be displaced or pivoted as a whole.

Other and further objects of the invention will become apparent from the more detailed description which follows, from the drawings and from the claims.

SUMMARY OF THE INVENTION

The novel spray water catch basin construction of the present invention collects not only the spray water from the filter plate located in the spraying device but also collects the water which drains and drips from the neighboring filter plates due to the critical dimension of the width of the catch basin in relation to the spray conduits because half the basin's width exceeds the drainage path of a filter plate from the stack of filter plates. Despite the wide catch basin, the spray device can be moved far enough to the ends of the filter press for the spray pipe to be capable of moving up and down because the spray water catch basin is able to be moved out of the way in the zone towards the center of the filter press.

The novel construction of the catch basin includes suspension means for suspending the spray water catch basin from support rods which are displaceably guided in tubings mounted to the underside of the support frame. The support rods maintain the spray water catch basin in a flexible manner by means of spring elements in a position which is symmetrical to the center plane of the frame. The support rods, guided in said tubings, ensure that the catch basin will be kept in a constant horizontal position. As the basin approaches a filter press end wall it is displaced against the tension springs in the direction of the center of the filter press. When the spray device moves back, the tension springs pull the basin back into its basic position.

According to an alternative embodiment of the invention the spray water catch basin may be connected by parallelogram links to the underside of the support frame. In this embodiment return springs are not needed because the basin's own weight tends to return it into its stable low position.

In still another embodiment of the invention, the spray water catch basin consists of three basin segments approximately equal in dimensions of which the center segment is rigidly fixed to the support frame while the other two segments are each seated on one longitudinal side of the central one over which they can move. In this telescoping design the catch basin is reduced in width as it approaches an end of the press. One basin segment retains its relative position to the central one while the other basin segment is displaced on the central one in the direction of the opposite segment. In order to drain the spray water that was collected by the movable side segments of the basin, the design of the invention provides that the two movable segments are open at their lengthwise sides facing the central segment and that they be provided with downward pointing water drainage walls reaching into the central basin segment.

Further features of the invention provide that the ends of the transverse walls of the movable basin segments facing the central segment be guided in C-rails and that compression springs be mounted between the two movable basin parts.

According to another embodiment of the invention, the spray water catch basin may consist of three segments approximately equal in their dimensions of which the central segment is rigidly fastened to the support frame while the other two segments are each seated on one longitudinal side of the central one to which they are hinged so as to be pivotable upward, the bottoms of the pivoting basin segments being rounded upward at the free longitudinal sides, and guidance means at the vertical posts being provided for the pivoting basin segments.

As the spray cleansing device approaches the vertical posts, the upward bent bottom of the leading pivoting segment enters the guidance means and is deflected upwardly. As soon as the spray cleansing device moves away from the posts, the basin segment pivots back into the horizontal position by virtue of its own weight.

In a special embodiment of the invention, the support frame is complemented at its lower end above the spray water catch basin into a stable rectangular structure by means of a cross beam. This step enhances the rigidity of the support frame, especially when the catch basin is supported in hinged manner from the support frame or is displaceable as a whole.

BRIEF DESCRIPTION OF THE DRAWINGS

The novel catch basin construction and suspension for the filter press of the invention is illustrated in further detail in relation to the several embodiments shown in the Figures of the drawings as set forth below:

FIG. 1 is a side elevational view of a filter press provided with a spray cleansing device and catch basin of the invention;

FIG. 2 is a simplified perspective view of a first embodiment of the spray cleansing device with a spray water catch basin;

FIG. 3 is a perspective view of a second embodiment a spray water catch basin of the invention adapted to be used with the spray cleansing device;

FIG. 4 is a perspective view of a third embodiment of a spray water catch basin of the invention adapted to be used with the spray cleansing device;

FIG. 5 is a sectional view along line V—V of FIG. 4 through the spray water catch basin; and FIG. 6 is a filter press with a fourth embodiment of the spray water catch basin of the invention.

DESCRIPTION OF THE PREFERRED EMBODIMENTS

There is shown in elevational view in FIG. 1 the combination of one embodiment of spray water catch basin means 66, spray washing means, e.g., the plate spraying device, 17, and the filter press of the plate type.

The plate spraying means 17 is shown in perspective in FIG. 2 and is of the type described and claimed in our prior U.S. Pat. No. 4,107,042.

The filter press, as shown in FIGS. 1 and 5, comprises vertical end posts 1 and 2 upon which I-beam horizontal guides 3 and 4 are disposed in parallel at an adjustable distance from one another. The bottom side of the I-beam horizontal guides is provided with two parallel strut members under tension, e.g., parallel tension cross beams 5 and 6, to create the filter press frame from which the filter plates 9 are suspended for displaceable movement from the lower outer flanges of the horizontal longitudinal I-beam guides 3 and 4.

The plate spraying means 17 is movably supported on the upper flange of the horizontal longitudinal I-beam guides 3 and 4. Spraying means 17, as shown in FIG. 2, comprises a spray pipe formed with a single inlet portion and a loop portion formed of two branched conduits 26 and 27 which are adapted to enclose a selected filter plate 9 between said branched conduits. Nozzles 28 are formed along the inner length of each conduit 26 and 27 facing each other, thus simultaneously spraying against opposite lateral surfaces of a selected filter plate 9 under the same spraying pressure as is used during the spray washing of the filter plate with water in conventional, earlier used washing operations.

The spray washing means 17 includes a rectangular carrier frame to support the spray pipe and conduits 26 and 27, namely support frame 21, including generally vertical struts identified as side girders 22 and 23 which have an open channel or C profile and guide fastening means 24 for securing vertical pipe portion 25, which pipe is movable upwardly and downwardly. The fastening means 24 include weights on each side, the weights hanging from cables 29 and 30. A wind up bobbin at the top center of the frame 21 is provided which serves to wind up the cable during the up and down movement of the spray conduits 26 and 27.

The novel spray water catch basin means 66, shown in FIGS. 1 and 2, is suspended from the lower ends of the vertical girders 22 and 23 by means of side support rods 62 and 63 which fit into sleeves 60 and 61 respectively, the sleeves 60 and 61 being each secured to the bottom edge of girders 22 and 23 respectively by, for example, welding.

The ends of each of the side support rods 62 and 63 are secured to vertical support arms 65, as shown in FIG. 2, there being two vertical support arms for rod 62 adjacent one end of the spray water catch basin while the other two vertical support arms for rod 63 lie at the opposite end of the spray water catch basin whereby the catch basin 66, frame 21, spray means 17, weights 24 cable 29 and bobbin all move as a unit along the longitudinal guideway of the filter press provided by the I-beam horizontal guide means 3 and 4.

In the preferred embodiment of spray water catch basin 66 shown in FIGS. 1 and 2, the width of the catch basin, which represents the distance between the catch basin ends adjacent support rods 62 and 63 respectively, is more than twice the distance of separation between the two conduits and is preferably about three times as wide as the spacing between the branched conduit 26 and 27 and the spray pipe 25. Spring elements, e.g., tension springs 67, are mounted between the vertical support arms 65 and the longitudinal center of sleeves 60 and 61 whereby the basin 66 is centered.

As shown in FIG. 2, convexly curved baffle plates 68 and 69 extend lengthwise along the catch basin 66. A drain orifice 70 is located at the side of basin 66 and connected to a water drain 71.

Turning now to FIG. 1, the spray device 17 is shown in the positon of operation that it assumes when spraying off the filter plates 9 adjacent to post 2 of the filter press. The plate 9 is a distance A, the path of removal, from post 2. Accordingly, at the location of plate 9 at distance A the end of the spray water catch basin 66 hits the end wall of the filter press by means of the upper edge of the baffle 69. When the spray device is in this location and is moved into said distance A spraying position, the basin 66 is kept back but the support frame 21 can continue to move in the direction of post 2 of the filter press. Thereby the support or guide sleeves 60 and 61 will move with respect to the support rods 62 and 63 and the catch basin 66 is positioned to be mostly to the right of support frame 21. This particular movement of the catch basin 66 is an important advantage in carrying out spraying operations and when the spray device moves back, the springs 67 pull the basin 66 back into the center position, as shown in FIG. 2.

FIG. 3 shows another embodiment of spray water catch basin 72 which is suspended at four pivot points on each side thereof through the four-link parallel linkage 73 and 74 from the vertical side girders 22 and 23 of the support frame 21. A cross-beam 75 completes the frame 21 to form a stable rectangular structure. The catch basin water passes through openings 76 in the front wall of the catch basin 72 by means of a chute 77 into a sideways drain (not shown). Catch basin 72 is easily moved in a manner similar to that explained above for FIG. 1 and upon impact by the filter press on one of the end plates the catch basin will be lifted somewhat in the process of movement so that gravity effects the return of the catch basin 72 to the initial position.

FIGS. 4 and 5 show a third embodiment of suspension of a spray water catch basin from the side girders 22 and 23 constituting the frame of the spray means 17. This third embodiment is termed the three segment catch basin having a center segment 78 supported between the side girders 22 and 23 and movable front and rear side segments 79 and 80 which are normally kept apart during spray cleansing by means of a compression spring means 85. The width dimensions of segments 78, 79 and 80 are critical.

The middle basin segment 78 is rigidly fastened to the lower ends of the vertical girders 22 and 23. The width of this segment 78 corresponds approximately to the spacing between the branch conduits 26 and 27 of the spray washing means 17 shown in FIG. 2. Two basin segments of the same design, 79 and 80, rest on the two longitudinal sides of basin segment 78. The longitudinal sides of the outer basin segments 79 and 80, facing the middle basin segment 78, are open and comprise water draining walls 81 and 82 pointing downward and projecting into the middle basin segment 78. The transverse side walls of basin segments 79 and 80, extending in the direction of the middle basin segment, are guided by means of bolts with heads, or similar, in two pairs of C profile rails 84, one above the other, one rail being mounted to the vertical girder 22 or 23 and the other near the ground in the vicinity of the center basin segment 78 in each case. Compression springs 85 force the movable basin segments 79 and 80 apart until the downward folded inside walls 81 and 82 rest against the longitudinal walls of the middle basin segment. Once the spray device has moved into one end position, the corresponding movable basin segment 79 or 80 will be displaced inwardly towards the other, over the center basin segment 78. A groove 86, stretching over the entire width of the basin bottom and containing the central drain 87, is provided in the bottom of the center basin segment 78.

In FIG. 6 there is shown in side view a fourth embodiment of a hinged and segmented spray water catch basin fitted to a filter press and suspended from the girders 22 and 23 of the spray washing frame 21. A middle basin segment 88 is rigidly fastened by means of braces 89 to the lower ends of the vertical girders 22 and 23. Two end basins segments 90 and 91 of the same design as middle segment 88 are shown at rest on the two longitudinal sides of basin segment 88 in FIG. 6 and are hinged to the middle basin segment in such manner as to be upwardly pivotable about the hinge. Lifting strips 92 and 93 are mounted to the vertical posts 1 and 2 approximately at the level of the spray water catch basin. When the spray washing means 17 and frame 21 are moved in the direction of post 2, shown at the left of FIG. 6, the leading basin segment 91 passes onto the lifting strips 93 by means of its upwardly rounded bottom and is pivoted upwardly. As soon as the spray washing means 17 and frame 21 are moved away from post 2, the basin segment 91 pivots back into the horizontal position by virtue of its own weight and assumes the same resting postion on the center segment 88 as basin segment 90 assumes in its resting position in FIG. 6. In some cases of operation, it is enough to provide only a single pivoting basin segment 90 or 91 for the desired enlargement of the middle basin segment 88 while still maintaining the critical limitation that the width dimension of the catch basin is more than twice the distance between the conduits 26 and 27 of the spray washing means 17.

Having thus disclosed the invention, we now claim:

1. In a filter press having two vertical posts and fitted with a spray washing means for one of a stack of filter plates which are displaceable on horizontal longitudinal guides of said press, said spray washing means comprising a support frame formed of vertical side girders which is movable along the stack of filter plates and surrounds the stack of filter plates together with the guides, a spray pipe with two branch conduits equipped with spray nozzles for guided up and down movement at said vertical side girders of said support frame, said nozzles of said conduits being directed towards each other, and a spray water catch basin mounted to the underside of said support frame, that improvement comprising:

said spray water catch basin having a width larger than twice the lateral spacing between said two branch conduits;

suspension means for said catch basin including securing means for attaching the center portion of the spray water catch basin to the bottom of the vertical side girders thereby permitting movement of said catch basin as a unit with said support frame and spray washing means along the entire longitudinal extent of said horizontal guides of the filter press whereby a width greater than twice the spray spacing prevents unwanted diversion of the water sprayed against the plates; and said catch basin being movable in a horizontal direction relative to the support frame in such a way, that at least that part of the catch basin projecting at one side of the support frame before the respective branch conduit will be pushed back by the respective one of said vertical posts, when the support frame is moved closely to said one vertical post.

2. A filter press combination as claimed in claim 1 wherein said spray water catch basin is suspended from support rods which are guided within sleeves which are rigidly mounted to the underside of the vertical side girders of the support frame by means of a pair of vertical support arms attached to said frame.

3. A filter press combination as claimed in claim 2 wherein said support rods, which are pivotably mounted to said spray water catch basin by said vertical support arms, are kept apart by means of spring elements in an open position on each side of the center plane of the support frame.

4. A filter press combination as claimed in claim 1 wherein said spray water catch basin is linked by a parallel four-linkage means to the lower side of the support frame to facilitate movement of said catch basin with the support frame.

5. A filter press combination as claimed in claim 1 wherein said spray water catch basin comprises three basin segments, two end segments and one center segment, each of approximately equal dimensions with the center segment being rigidly fastened by fastening means to the support frame while the two other segments each rest displaceably on one longitudinal side of the center basin segment and can be moved over this center basin segment to provide a width of the two or three segments greater than the spacing between the spray conduits.

6. A filter press combination as claimed in claim 5 wherein the two movable basin segments are open at their lengthwise sides facing the center basin segment and comprise downward pointing water-draining walls projecting into the said center basin segment to facilitate draining water sprayed against the filter plates.

7. A filter press combination as claimed in claim 6 wherein the ends of the transverse walls of said movable basin segments that face the center basin segment are guided within C-profiled rails constituting the vertical side girders of said support frame.

8. A filter press combination as claimed in claim 7 wherein compression springs are mounted between said two movable basin segments.

9. A filter press combination as claimed in claim 1 wherein said spray water catch basin consists of three basin segments, two end segments and one center segment, each of approximately equal dimensions with the center segment being rigidly fastened by fastening means to the support frame while the other segments each rest displaceably on one longitudinal side of the center basin segment and are hinged to the center basin segment so as to be upwardly pivotable, the bottoms of said end pivoting basin segments being rounded upward at the free longitudinal sides and cooperate with lifting strips which are provided and mounted to the filter press vertical posts whereby said pivoting basin segments are lifted by said strips when contacted at the ends of the press adjacent the posts.

* * * * *